United States Patent
Willms et al.

(10) Patent No.: US 12,005,459 B2
(45) Date of Patent: Jun. 11, 2024

(54) METHOD AND FACILITY FOR PRODUCING MATERIAL CONTAINING HYDRATED CEMENT

(71) Applicants: thyssenkrupp Industrial Solutions AG, Essen (DE); thyssenkrupp AG, Essen (DE)

(72) Inventors: Eike Willms, Dortmund (DE); Guido Kache, Beckum (DE); Jost Lemke, Ennigerloh (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 610 days.

(21) Appl. No.: 17/276,881

(22) PCT Filed: Sep. 17, 2019

(86) PCT No.: PCT/EP2019/074827
§ 371 (c)(1),
(2) Date: Mar. 17, 2021

(87) PCT Pub. No.: WO2020/058247
PCT Pub. Date: Mar. 26, 2020

(65) Prior Publication Data
US 2022/0032316 A1 Feb. 3, 2022

(30) Foreign Application Priority Data
Sep. 20, 2018 (DE) .................... 10 2018 123 115.6

(51) Int. Cl.
*B02C 23/38* (2006.01)
*B02C 23/10* (2006.01)
(Continued)

(52) U.S. Cl.
CPC .............. *B03B 9/065* (2013.01); *B02C 23/10* (2013.01); *B02C 23/18* (2013.01); *B02C 23/24* (2013.01); *B02C 23/38* (2013.01); *C04B 18/167* (2013.01)

(58) Field of Classification Search
CPC ......... B02C 23/10; B02C 23/18; B02C 23/24; B02C 23/38; B02C 23/12; B02C 23/14;
(Continued)

(56) References Cited

U.S. PATENT DOCUMENTS

| | | | | |
|---|---|---|---|---|
| 4,637,556 A | * | 1/1987 | Dunn | ...................... B02C 23/32 |
| | | | | 241/79.1 |
| 4,703,897 A | * | 11/1987 | Beisner | ................... B02C 23/32 |
| | | | | 241/230 |
| 5,850,977 A | * | 12/1998 | Csendes | ................ B02C 19/005 |
| | | | | 241/24.31 |

FOREIGN PATENT DOCUMENTS

| | | |
|---|---|---|
| DE | 19738471 A | 3/1999 |
| EP | 2895436 B | 8/2017 |

(Continued)

OTHER PUBLICATIONS

English Translation of International Search Report issued in PCT/EP2019/074827, dated Dec. 12, 2019.
(Continued)

*Primary Examiner* — Faye Francis
(74) *Attorney, Agent, or Firm* — thyssenkrupp North America, LLC (57) ABSTRACT

A method for processing material that contains cement rock may involve comminuting the material in a first comminuting device, feeding the material to a reactor in which the material is mixed with an aqueous liquid and $CO_2$ and in which a mixing movement of the material is generated, and removing the material from the reactor and subdividing the material into at least two fractions by way of a classifying (Continued)

device. The temperature and the pressure in the reactor are maintained such that the pressure exceeds atmospheric pressure and such that the temperature is greater than 100° C. The method may further involve removing a withdrawal stream of the aqueous liquid from the reactor and separating and discharging suspended particles of the material from the withdrawal stream.

17 Claims, 4 Drawing Sheets

(51) Int. Cl.
*B02C 23/18* (2006.01)
*B02C 23/24* (2006.01)
*B03B 9/06* (2006.01)
*C04B 18/167* (2023.01)

(58) Field of Classification Search
CPC ......... B02C 23/22; B02C 23/26; B02C 23/28; B02C 23/32; B02C 23/34; B02C 2018/147
See application file for complete search history.

(56) References Cited

FOREIGN PATENT DOCUMENTS

| | | |
|---|---|---|
| JP | 3543934 B | 7/2004 |
| WO | 2014154741 A | 10/2014 |

OTHER PUBLICATIONS

Seidemann, M et al., "CO2—integration in concrete recyclates", (conference contribution: papers for the recycling conference R'13, 10 pages (Sep. 19 & 20, 2013).

Raw material supply and resource productivity in the German cement industry, Analysing the status quo and prospects, Initiative for sustainability in the German cement industry, Wuppertal Institute for Climate, Environment, Energy GmbH, 70 pages (Oct. 2015).

Seidemann, M. et al., "Further development of the carbonation of recycled aggregates from old concrete (2nd phase: process optimization on a laboratory scale and technology design", Final report on a development project, funded by the Deutsche Bundesstiftung Umwelt under ref. No. 23689/02, 104 pages (Nov. 30, 2015).

\* cited by examiner

METHOD AND FACILITY FOR PRODUCING MATERIAL CONTAINING HYDRATED CEMENT

CROSS REFERENCE TO RELATED APPLICATIONS

This application is a U.S. National Stage Entry of International Patent Application Serial Number PCT/EP2019/074827, filed Sep. 17, 2019, which claims priority to German Patent Application No. DE 10 2018 123 115.6, filed Sep. 20, 2018, the entire contents of both of which are incorporated herein by reference.

FIELD

The present disclosure generally relates to methods and plants for processing material that contains cement rock.

BACKGROUND

The material can in particular be a solid waste material, such as, for example, recycled concrete, which has accrued during demolition activities. Such recycled concrete contains what is known as cement rock, i.e. hardened cement paste, which in turn is a mixture of cement and water. Cement paste forms the basis for concrete or else mortar, with rock particles, what are referred to as the aggregate, in particular sand and/or gravel, usually also being admixed to this.

Cement is obtained by finely grinding cement clinker. For the production of cement clinker, cement raw materials, in particular limestone and clay as well as possible corrective materials such as, for example, quartz sand and iron-oxide-containing materials, are ground to afford raw meal, then calcined and sintered by burning in a clinker furnace. During the calcination, the limestone is deacidified, $CO_2$ being driven out.

The cement rock which, for example, concrete contains is slowly recarbonated by $CO_2$ contained in the ambient air while the concrete is being used, but only in part, usually in an order of magnitude of approximately 25% to 30%.

The proportion of the cement rock that has not been recarbonated has a considerable potential for recarbonation, which can be exploited by suitable processing steps. The potential for recarbonation is important insofar as the cement rock can incorporate and thus immobilize CO2.

Research projects concerned with the recarbonation of cement rock are described in the following publications:

Seidemann, M. et al. "CO2-Einbindung in Betonrezyklaten" [CO2 incorporation in recycled concrete], (conference contribution: Papers zur Fachtagung Recycling [papers for the recycling conference] R'13, Sep. 19/20, 2013), Report on the study "Rohstoffversorgung und Ressourcenproduktivität in der deutschen Zementindustrie" [Raw material supply and resource productivity in the German cement industry] carried out by the Wuppertal Institut für Klima, Umwelt, Energie GmbH [Wuppertal Institute for Climate, Environment, Energy GmbH], Wuppertal, completed in October 2015, Final report on a development project, sponsored under the file reference 23689/02 by the Deutschen Bundesstiftung Umwelt [German Federal Environmental Foundation], with the title: "Weiterentwicklung der Karbonatisierung von rezyklierten Zuschlägen aus Altbeton (2.Phase: Prozessoptimierung im Labormaßstab und Technologieentwurf)" [Further development of the carbonation of recycled aggregates from old concrete (2nd phase: process optimization on a laboratory scale and technology concept], dated Nov. 30, 2015.

Up until now, to a relatively large extent recycled concrete has only been worked to afford relatively low-grade products and used, for example, as a substitute for ballast, or are disposed of in landfill.

One difficulty with regard to a relatively high-grade use of recycled concrete is to recover the cement rock by type as far as possible, since recycled concrete usually contains cement rock only in a relatively small proportion of between 15% and 20%, depending also on the degree of processing thereof. In addition, cement rock is usually fixedly connected to other rocks which concrete contains. If recycled concrete is comminuted for processing purposes, this frequently leads to the fracture operations proceeding in a non-selective manner, i.e. not at the boundaries between cement rock and the other types of rock. A non-selective comminution means that the rocks which the recycled concrete contains cannot be recovered, or can be recovered only to a small extent, by type. Thus, all processes in which relatively fine grinding precedes recarbonation can be characterized as less efficient from a technological perspective.

EP 2 895 436 B1 discloses a method for producing aggregate and calcium carbonate from concrete particulate rocks, having the following method steps:

introducing bulk material, which comprises concrete particulate rocks and which can have a grain size of 2 to 20 mm, into a reaction space;

feeding a gas comprising carbon dioxide into the reaction space;

comminuting the bulk material in the reaction space, which can be effected in particular abrasively;

leaving the concrete particulate rock and the gas comprising carbon dioxide to react with one another to afford reaction products in the reaction space;

discharging the reaction products from the reaction space.

DE 197 38 471 A1 describes a concrete recycling plant for the reprocessing of residual concrete from unused fresh concrete residues and from residues which have accrued during the cleaning of concrete producing and concrete transporting equipment. In the process, solid constituents are washed out of the residual concrete by adding rinsing water and classified in a classifying screen.

Thus, a need exists for a way of processing to a high grade a material which contains cement rock, in particular recycled concrete, with the cement rock to be recarbonated and recovered by type as far as possible from other rocks which the material contains.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to the invention, a method for processing material which contains cement rock is provided, wherein the material is (pre)comminuted in a first comminuting device and then fed to a reactor in which the material is mixed with an aqueous liquid and CO2 and in which a mixing movement of the material is generated, wherein the material which is removed from the reactor is subdivided into at least two fractions which differ in terms of grain sizes by means of a classifying device.

A plant according to the invention that is suitable for carrying out such a method comprises at least
- a first comminuting device for comminuting the material,
- a reactor, which is connected to the first comminuting device in a material-carrying manner and comprises a mixing device,
- a fluid supply for an aqueous liquid that is connected to the reactor in a fluid-conducting manner,
- a gas supply for CO2 that is connected to the reactor in a fluid-conducting manner, and
- a classifying device, connected to the reactor in a material-carrying manner, for separating the material into at least two fractions.

A core aspect of the method according to the invention is the mixing or bringing into contact of the precomminuted material with water (the water contained in the aqueous liquid) and the CO2 in the reactor, whereby recarbonation of the cement rock can be achieved. The reactions specified below proceed in the process:

$$C\text{—}S\text{—}H + CO_2 \rightarrow CaCO_3 + SiO_2 + H_2O$$

$$CaOH + CO_2 \rightarrow CaCO_3 + H_2O.$$

In this respect, the reaction of CaOH with CO2 appears to dominate provided that CaOH is available. The decomposition of the calcium silicate hydrate phases (CSH phases) begins only when the availability of CaOH is limited.

Conversion of the CaOH of the cement rock leads to a considerable improvement in the properties of the rocks when the fractions are being used further; this applies, for example, if said rocks are to be used at least partially in new concretes. In particular, the porosity of the cement rock decreases after carbonation of the CaOH, whereby substantially all of the workability parameters can be improved.

As a result of the treatment of the material in the reactor, the strength of the cement rock is also reduced. This applies in particular when treatment takes place at temperatures above the ambient temperature, it also being possible for the temperatures to be set for this to be pressure-dependent. At atmospheric pressure inside the reactor, a temperature of between 50° C. and 100° C. can preferably be set. According to the invention, by contrast, at least temporarily an excess pressure (in comparison with the atmospheric pressure) and a temperature of greater than 100° C. inside the reactor are set. In the context of a method according to the invention, it is therefore provided that the temperature and the pressure in the reactor are correspondingly influenced. For this purpose, a plant according to the invention comprises a corresponding temperature regulating device, by means of which a temperature inside the reactor can be influenced upward or downward, and a pressure influencing device, by way of which at least an excess pressure can also be generated inside the reactor. In this respect, the temperature in the reactor can be influenced by a corresponding temperature regulation of the reactor itself and/or of the material to be fed to the reactor and/or of the aqueous liquid to be fed to the reactor and/or of the CO2 gas stream to be fed to the reactor. Temperature regulation can preferably also be provided at least for the aqueous liquid, it being possible to implement this advantageously in terms of process technology.

The reduced strength of the cement rock can be utilized in the context of a further core aspect of the method according to the invention, specifically the generation of a mixing movement in the reactor, in order to realize further comminution of the fragments by regular contact of the precrushed fragments with one another and also optionally with mixing elements of the mixing device of a plant according to the invention that bring about the mixing movement. In this case, as a result of the targeted reduction of the strength of the cement rock, a comminution of the fragments which is selective is in particular also achieved, with the result that the crushing operations proceed in particular at the boundaries between cement rock and the other types of rock. In particular, the intensive contact between the fragments makes it possible to generate very fine-grained abraded material, which is primarily formed from cement rock.

This very fine-grained abraded material can advantageously be separated by removing a withdrawal stream of the aqueous liquid, which contains the abraded material in the form of suspended particles, from the reactor and then separating said abraded material from the withdrawal stream by means of a corresponding separating device. The withdrawal stream of the aqueous liquid can then be returned to the reactor as a recirculation stream, as a result of which the consumption of aqueous liquid can be kept low when carrying out a method according to the invention.

According to the invention, before being introduced into the reactor, the material is precrushed, preferably to form fragments the largest dimensions of which can be up to any desired defined value of between 32 mm and 63 mm, it being possible to set this by a corresponding selection and operation of the (first) comminuting device that is directed thereto. Compared to comminution or precrushing with a smaller upper limit value for the respective largest permissible dimension of the fragments, a relatively coarse precrushing provided according to the invention is characterized by a low energy requirement.

Furthermore, it is provided according to the invention that, after the treatment in the reactor, the material is subdivided into at least two, preferably at least or exactly three fractions, by means of the classifying device. In this respect, it can preferably be provided that a coarse fraction is returned to the reactor because its grain size may be too large for recycling and/or because a (coarse) fraction which is sufficiently of a single type cannot be assumed with such a large grain size. For this purpose, a plant according to the invention can comprise a corresponding material return line.

The or at least one of the other fractions, which in the case of more than two fractions is preferably medium-sized and is consequently referred to below as the medium fraction, can have grain sizes in a range which enables advantageous further use and/or in which a fraction which is sufficiently of a single type can be assumed. In the context of a method according to the invention, such a fraction can therefore be discharged, i.e. there is no further working of this fraction in the context of a method according to the invention. In particular, this fraction can be a finished product which should no longer be treated further with the aim of changing it, but rather can be used unchanged as an additive, for example.

It can preferably be provided that fragments of the material, the grain sizes of which are greater than 16 mm (coarse fraction), are returned to the reactor in the context of a method according to the invention. If the fragments of the material are separated into more than two and in particular into exactly three fractions by means of the classifying device, it can furthermore preferably be provided that the grain sizes of the or a middle fraction are between 2 mm and 16 mm. In this case, a fine fraction, the grain sizes of which are smaller than 2 mm, can consequently also be separated by means of the classifying device. Such a fine fraction can also preferably be discharged, it being possible to provide that the fine fraction is provided for reuse. When processing recycled concrete, such a fine fraction can in particular be sand which is largely of a single type and can advantageously be recycled. Should the fine fraction be unsuitable for reuse, it can be disposed of in landfill.

It may optionally also be the case that a fraction separated by means of the classifying device, in particular the middle fraction mentioned, the grain sizes of which are preferably between 2 mm and 16 mm, is not or is not always sufficiently of a single type. In order to be able to determine this, it can be provided that this fraction is analyzed in terms of the cement rock content. Further preferably, it can then also be provided that this fraction is returned to the reactor if the determined cement rock content is greater than a limit value defined in this regard. The corresponding proportion of this fraction can then be retreated inside the reactor with the result that, after renewed separation in the classifying device, the quality requirements for this are met. A plant according to the invention can comprise a corresponding analyzing device and a corresponding material return line.

In order to achieve a decomposition which is as fast/extensive as possible of the calcium silicate hydrate phases (CSH phases), which confer strength on the cement rock, provision can preferably be made for a basic additive (e.g. NaOH) to be introduced into the reactor. This allows the pH to be set in a controlled manner during the reaction in the reactor. For this purpose, a plant according to the invention can comprise a corresponding introducing device for such a basic additive.

A particularly good mixing of the material with the aqueous liquid and with the $CO_2$ can be achieved in the context of a method according to the invention if the aqueous liquid and the $CO_2$ flow through the material in the reactor in a counterflow arrangement. For this purpose, the reactor of a plant according to the invention can preferably have a first end, which is assigned a material inlet for introducing the material into the reactor, a liquid outlet for discharging aqueous liquid from the reactor, and a gas outlet for discharging $CO_2$ from the reactor. Furthermore, such a reactor can have a second end, preferably opposite the first end, which is assigned a material outlet for discharging the material from the reactor, a liquid inlet for introducing the aqueous liquid into the reactor, and a gas inlet for introducing the $CO_2$ into the reactor. It can preferably be provided that the reactor is designed as a vertical reactor, such that, based on the direction of gravity, said reactor comprises the material inlet, the liquid outlet and the gas outlet at the upper, first end, and the material outlet, the liquid inlet and the gas inlet at the lower, second end.

The liquid inlet and the gas inlet may also be formed integrally, with the result that the aqueous liquid and the $CO_2$ are then mixed with one another before being introduced into the reactor. In particular, it can be provided here that the $CO_2$ is dissolved in the aqueous liquid.

When carrying out a method according to the invention, in which the aqueous liquid and the $CO_2$ flow through the material in the reactor in a counterflow arrangement, it can furthermore preferably be provided that the $CO_2$ is fed into the reactor in an overdose, i.e. in a quantity that cannot be fully reacted by the material which the reactor contains during a run-through. As a result, $CO_2$ may also still be available in the region of the material inlet or the gas outlet to an extent that ensures a reaction of the $CO_2$ with the cement rock that is as extensive as possible. In this case it is expedient for a gas stream of the $CO_2$ to be removed from the reactor via the gas outlet and recirculated to the reactor. This makes it possible for the $CO_2$ which was not reacted in the previous run-through to be reused. A plant according to the invention can comprise a corresponding gas return line for this purpose.

According to a preferred embodiment of a method according to the invention, in which a coarse fraction from the classifying device is returned to the reactor, it can be provided that the coarse fraction is comminuted in a second comminuting device before being returned to the reactor. This makes it possible to increase the sizes of the surfaces of the fragments of the coarse fraction which is brought into contact with the aqueous liquid and the $CO_2$ in the reactor.

A discharge of the material from the reactor together with part of the aqueous liquid can be implemented in a technically simple manner. Accordingly, it can also be provided that the at least two fractions are separated from a discharge stream of the aqueous liquid that was removed from the reactor with the material. In order to keep the consumption of aqueous liquid low, it can furthermore preferably be provided that the discharge stream of the aqueous liquid freed of the fractions is at least partially returned to the classifying device and/or at least partially to the reactor.

Should exactly three fractions be separated by means of the classifying device, it can furthermore preferably be provided that the classifying device comprises a two-stage screening device, wherein the coarse fraction in a first screening stage and the middle fraction in a second screening stage are separated from the discharge stream of the aqueous liquid with the fragments of the material included therein. A separating device, which can be designed, for example, in the form of a hydrocyclone, can then also be connected downstream of the screening device. In this separating device, the fine fraction can then also be separated from the discharge stream of the aqueous liquid. The discharge stream of the aqueous liquid can then be substantially freed of the material. If necessary, a filter press, by means of which the fine fraction can be further dewatered, can also be connected downstream of the hydrocyclone.

The treatment in the reactor makes it possible to substantially only process mineral constituents of the material. It can therefore be advantageous in the context of a method according to the invention if non-mineral, in particular metallic constituents, such as those used in recycled concrete in particular for reinforcement purposes, are removed from the material before it is introduced into the reactor. This can be performed before and/or after the precrushing by the (first) comminuting device. A plant according to the invention can comprise a corresponding removing device for this purpose.

Figure 1:
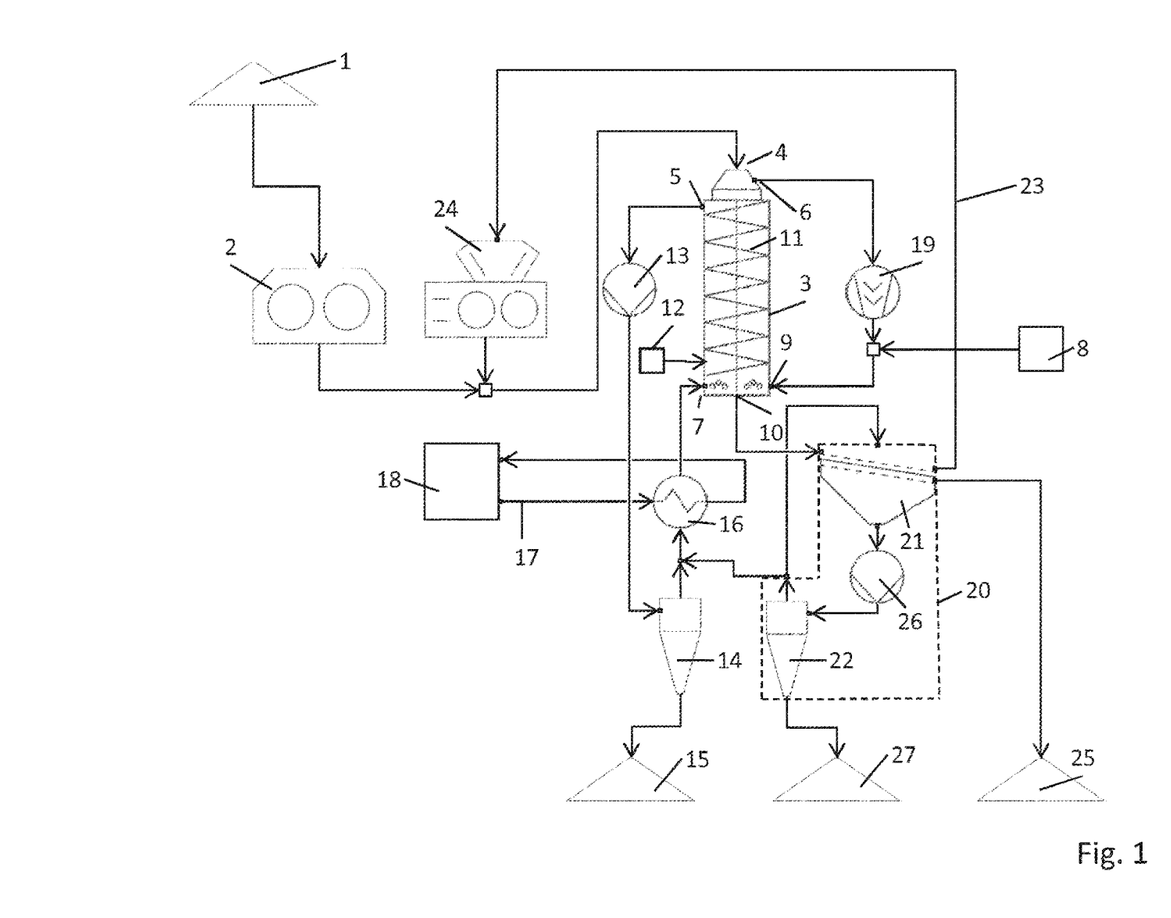
FIG. 1 is a flow diagram depicting an example plant and method for processing material that contains cement rock.
Figure 2:
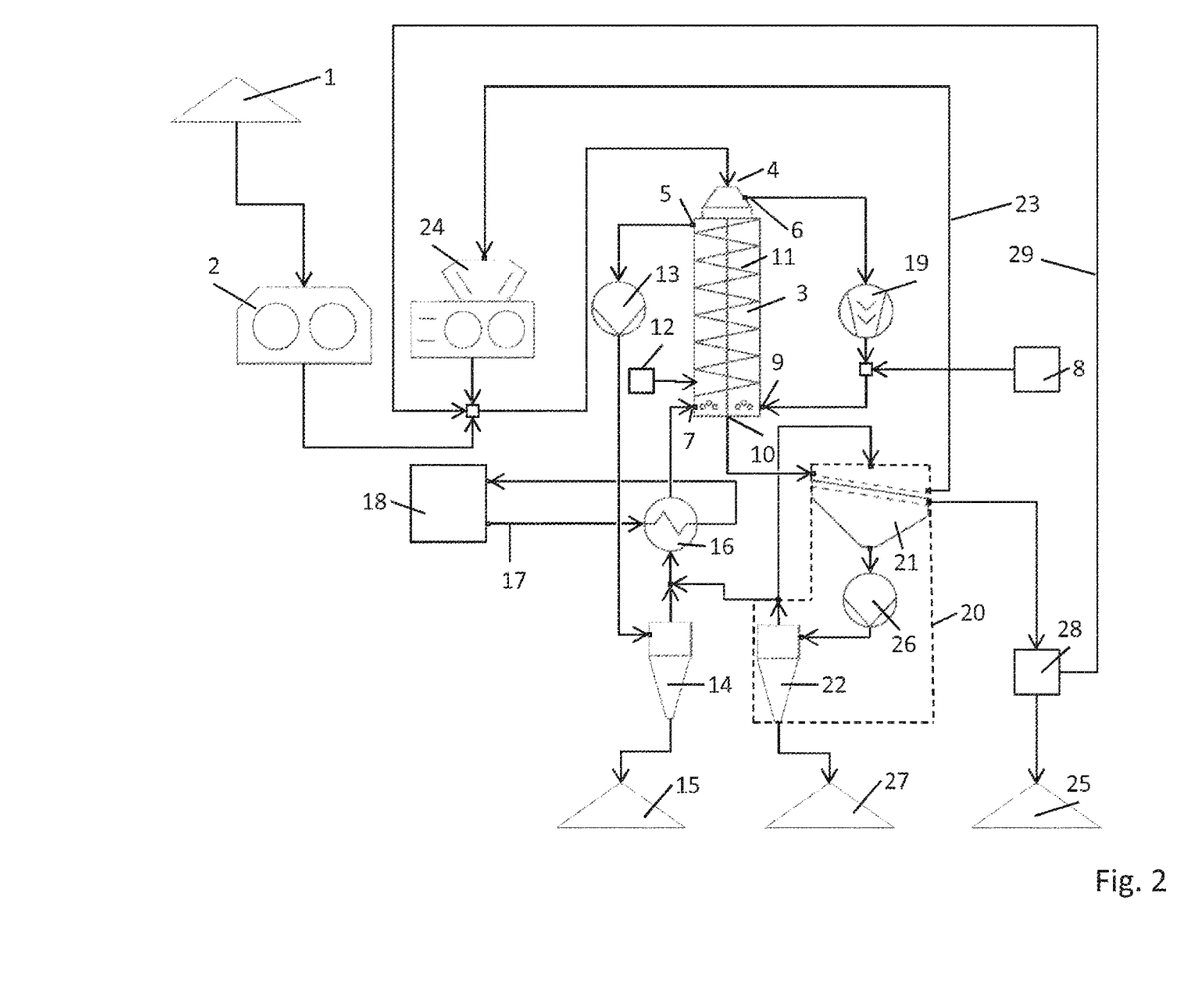
FIG. 2 is a flow diagram depicting another example plant and method for processing material that contains cement rock.
Figure 3:
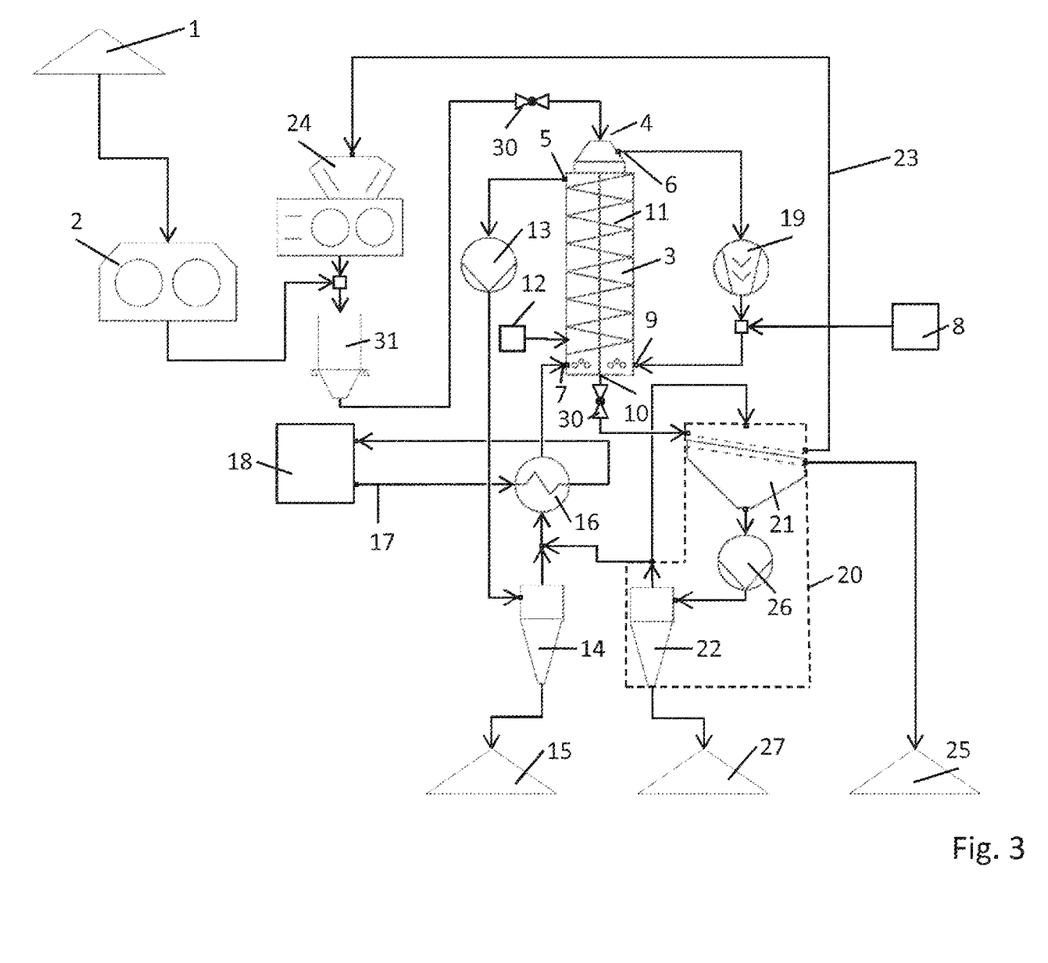
FIG. 3 is a flow diagram depicting still another example plant and method for processing material that contains cement rock.
Figure 4:
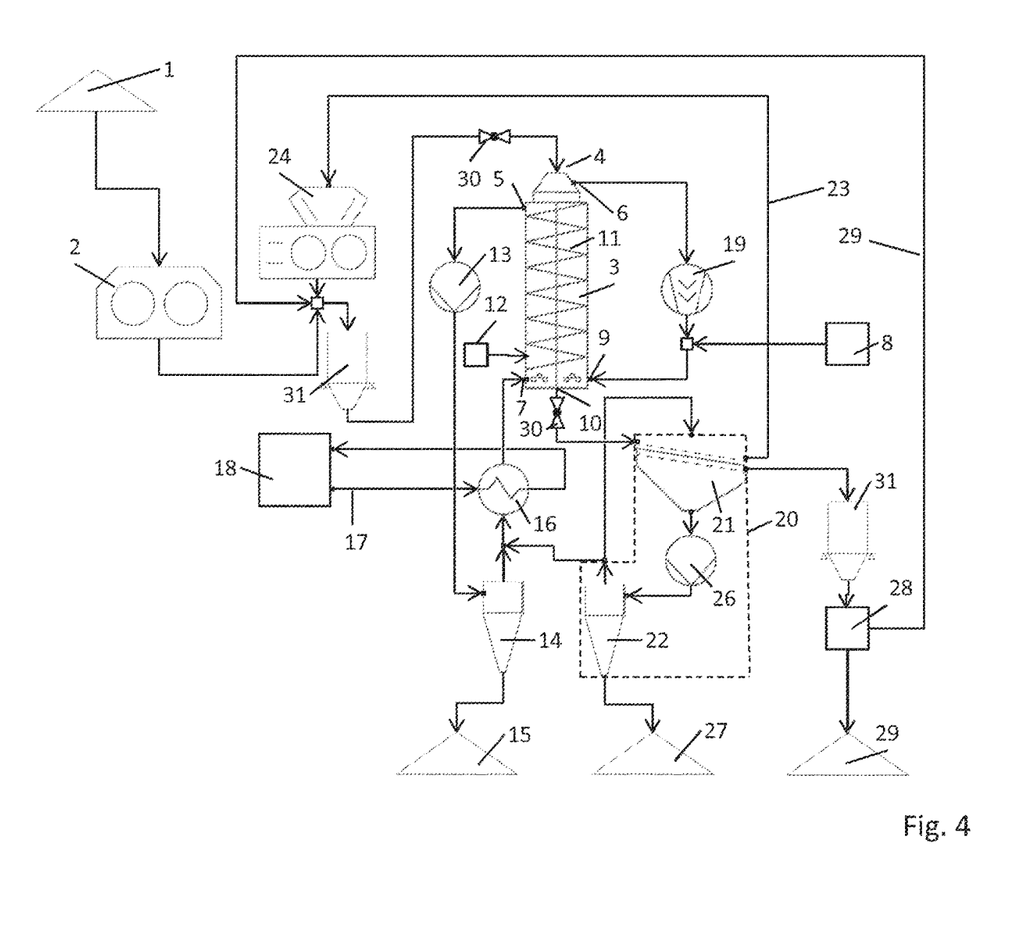
FIG. 4 is a flow diagram depicting yet another example plant and method for processing material that contains cement rock.

FIGS. 1 to 4 each show the performance of a method for processing material which contains cement rock, as well as the plant used for this, wherein, in the method according to FIGS. 3 and 4, according to the invention a reactor 3 is operated at a pressure which is above the ambient pressure and a temperature of above 100° C. is set inside the reactor 3.

When carrying out such a method, a lumpy material, which can be in particular recycled concrete, is removed from a storage area 1 and fed to a first comminuting device 2, it being possible for the material to have been coarsely processed before being fed to the first comminuting device 2. In particular, non-mineral constituents of the material, for example metallic reinforcements of the recycled concrete, may have been removed during this processing. It is also possible that, during this processing, comminution has already taken place or has become necessary, it being possible for provision to be made for the edge lengths of the resulting fragments of the material to be more than 300 mm.

In the first comminuting device 2, the material is coarsely precrushed, it being possible for the resulting fragments to have edge lengths or largest dimensions which can be up to 63 mm.

The material precrushed by means of the first comminuting device 2 is then fed to the reactor 3 of the plant. Said reactor is configured in the form of a vertical reactor, which can comprise in particular a cylindrical reactor housing. At a first, upper end of the cylindrical reactor housing, the reactor 3 has a material inlet 4, via which the material can be introduced into the interior space of the reactor. In this respect, sufficient tightness should be ensured in the region of the material inlet 4 in order to avoid the entry of ambient air via the material inlet 4 to the greatest possible extent. At this upper end, the reactor 3 also has a liquid outlet 5 for discharging aqueous liquid and also a gas outlet 6 (located higher than the liquid outlet 5) for discharging (overdosed) $CO_2$. The aqueous liquid and the $CO_2$ were introduced into the interior space of the reactor via a liquid inlet 7 and via a gas inlet 9, connected to a $CO_2$ gas storage means 8, which are provided at a second, lower end of the reactor 3. At this lower end, the reactor 3 also has a material outlet 10.

Material that has been introduced into the reactor 3 via the material inlet 4 sinks inside the interior space of the reactor in the direction of the material outlet 10 due to gravity, wherein the aqueous liquid and the $CO_2$, which flow from the respective inlets 7, 9 at the lower end to the respective outlets 5, 6 at the upper end of the reactor 3, flow through said material in a counterflow arrangement.

Also arranged inside the interior space of the reactor is a mixing device 11, which can have, for example, a central shaft which can be driven in rotation and has mixing elements. The mixing device 11 can, however, also be designed without a shaft or in the form of a mixing screw. Furthermore, the mixing device 11 can also be provided in the form of a mill, for example a ball mill, it then being possible for the number of grinding bodies to be selected to be significantly lower than that of a conventional ball mill, which primarily serves for grinding material. The function of the mixing device 11 is to ensure a permanent relative movement of the fragments of the material with respect to one another.

During the residence of the material inside the reactor 3, it is comminuted further as a result of these relative movements, new fracture surfaces which are available for a reaction with the aqueous liquid and the $CO_2$ continuously being produced. Furthermore, due to the presence of the aqueous liquid and the $CO_2$, the cement rock which the material contains is recarbonated. In this respect, the process conditions can be set in particular via the residence period of the material in the reactor 3, via the temperature in the reactor 3 (preferably between 50° C. and 100° C. in the ambient-pressure process according to FIGS. 1 and 2) and via the pH in the reactor 3, which can be influenced by means of an introducing device 12 for introducing a basic additive (for example NaOH) into the reactor.

As a result of the intensive contact between the fragments of the material during the mixing in the reactor 3, a very fine-grained abraded material is in particular also produced, which substantially consists of recarbonated cement rock. This abraded material is present substantially in the form of suspended particles within the aqueous liquid and can advantageously be removed from the reactor 3 via the liquid outlet 5 together with a withdrawal stream of the aqueous liquid. By means of a pump 13, this withdrawal stream of the aqueous liquid with the suspended particles included therein is fed to a separating device 14, designed for example in the form of a hydrocyclone. By means of this separating device 14, the abraded material is separated from the withdrawal stream of the aqueous liquid and discharged into a product storage area 15. Here, the abraded material may still be present in the form of a suspension, which can optionally also be dried or thickened (not illustrated).

Since the abraded material can substantially be cement rock of a single type, which has moreover been recarbonated to a relevant extent, it can advantageously be suitable for further use. This cement-rock abraded material can be similar in chemical terms to raw meal, which is used for the production of cement clinker, and can then therefore be used as a secondary raw material in such a production of cement clinker. Because this cement-rock abraded material can already be significantly finer-grained than raw meal of natural raw materials, when it is being used as a secondary raw material it is possible to save energy that would otherwise be required for grinding raw meal of natural raw materials. In addition, such raw materials would then have to be be extracted to a correspondingly reduced extent.

The withdrawal stream of the aqueous liquid that has been freed of the abraded material is returned to the reactor 3 via the liquid inlet 7 as a recirculation stream. Said withdrawal stream is first guided via a heat exchanger 16, in which it is possible to bring about a heat transfer to this withdrawal stream or a heat transfer from this withdrawal stream of the aqueous liquid to a temperature regulating medium (e.g. water) that circulates in a temperature regulating device 17. A heat source or heat sink 18 is also integrated into this temperature regulating device 17 in order either to provide thermal energy (e.g. waste heat from a nearby cement works), which can be transferred in the heat exchanger 16 to the withdrawal stream of the aqueous liquid, or to dissipate thermal energy which has been transferred from the withdrawal stream of the aqueous liquid to the temperature regulating medium (e.g. by means of an ambient heat exchanger).

$CO_2$, which has arrived at the upper end of the reactor 3 and thus in the region of the gas outlet 6 and consequently has not been reacted in the reactions taking place inside the reactor 3, is recirculated to the gas inlet 9 by means of a conveying device 19 designed as a compressor (e.g. screw compressor) or a blower (e.g. positive displacement blower) and consequently, in accordance with demand, having been mixed with fresh $CO_2$ from the $CO_2$ gas storage means 8, is reintroduced into the reactor 3. It can also be provided that at least part of the $CO_2$ is introduced into the withdrawal stream of the aqueous liquid downstream of the heat exchanger 16 by means of, for example, an injection condenser and fed to the reactor 3 in this way (not shown). Dosing of the $CO_2$ and thus in particular the extent of $CO_2$ from the $CO_2$ gas storage means 8 admixing into the recirculated gas stream of the $CO_2$ can preferably be set depending on the concentration of $CO_2$ in the region of the gas outlet 6.

The material treated in the reactor 3 is discharged from the reactor 3 together with a discharge stream of the aqueous liquid via the material outlet 10 and fed to a classifying device 20, which comprises, inter alia, a two-stage screening device 21 and a separating device 22 which is connected downstream of the screening device 21 and in turn is designed in the form of a hydrocyclone.

In a first screening stage of the screening device 21, a coarse fraction of the material which has grain sizes of greater than 16 mm is separated from the discharge stream. This coarse fraction is mixed into the stream of the "fresh" material via a material return line 23 with an integrated second comminuting device 24 which can be designed, for example, in the form of a high-pressure roller press, and guided (back) together with said stream into the reactor 3. Should the material be present in a form that allows it to be sufficiently constant and homogeneous in terms of the grain size and composition already after the precrushing in the first comminuting device 2, the return of the coarse fraction can optionally be dispensed with or the proportion of coarse fraction returned can be almost zero or be extremely low. Furthermore, there is also the possibility of forming the first comminuting device 2 and the second comminuting device 24 integrally or using the same comminuting device to comminute both the material fed from the storage area 1 and the returned coarse fraction of the material.

A middle fraction of the material, which has grain sizes of larger than 2 mm (and smaller than 16 mm), is separated from the discharge stream by means of a second screening stage of the screening device 21 and discharged into a product storage area 25. Said middle fraction can in particular be rocks which have been substantially completely freed of cement rock and which were provided in particular as an aggregate of the concrete. As a result of the use of materials of one type, said rocks can also advantageously immediately be reused.

A fine fraction of the material, the grain sizes of which are smaller than 2 mm, passes the screening device 21 together with the discharge stream of the aqueous liquid and, conveyed by means of a pump 26, is fed to the separating device 22 of the classifying device 20 and separated from the discharge stream thereby. This fine fraction, which can in particular be sand which is largely of one type, can also be discharged into a product storage area 27 and reused.

The discharge stream of the aqueous liquid freed of the fractions is partially returned to an inlet side of the screening device 21, in particular also to rinse said screening device, and partially mixed with the withdrawal or recirculation stream of the aqueous liquid and returned to the reactor 3 together therewith.

If necessary (for example, depending on the recycled concrete or material specifically to be treated), it can be expedient to analyze the middle fraction again with regard to the residual content of cement rock before it is discharged, for which purpose a plant according to FIG. 2 can comprise a corresponding analyzing device 28. The plant and the method performed thereby otherwise correspond to the plant and the method according to FIG. 1. If it is determined by means of the analyzing device 28 that the middle fraction (temporarily) has a proportion of cement rock which is greater than a limit value defined for this purpose, provision can be made for this portion of the middle fraction to be returned to the reactor 3 via a further material return line. As an alternative to the embodiment according to FIG. 2, it can also be provided here that this returned portion of the middle fraction is also guided via the second comminuting device 24 in order to comminute it further before it is introduced into the reactor 3.

The embodiments according to the invention of methods for processing material which contains cement rock, and the plants according to FIGS. 3 and 4 used for these methods differ from those according to FIGS. 1 and 2 substantially exclusively in that, according to FIGS. 3 and 4, the reactor 3 is operated at a pressure which is above the ambient pressure (preferably up to 500 mbar excess pressure). This also makes it possible, in particular, to set a temperature of above 100° C. inside the reactor 3, without the aqueous liquid evaporating to a large extent in the process.

For such a pressurized operation of the reactor 3, it must be temporarily isolated or separated in terms of pressure, at least with regard to the feed of material and discharge of material, it being possible according to FIGS. 3 and 4 to bring this about by the integration of corresponding shut-off valves 30. In this respect, material can be introduced into the reactor 3 and also material can be discharged from the reactor 3 either after the reactor 3 has been relieved of pressure, or it is the case that provided in the region of the feed of material and discharge of material should be pressure locks 31, which may also provide a relatively large intermediate storage volume for the material.

In the case of pressurized operation of the reactor 3, it should be noted that, when aqueous liquid is being discharged from the reactor 3 or when a pressure lock 31 is being opened, water vapor can suddenly escape. It can therefore be expedient to cyclically increase the temperature inside the reactor 3 to more than 100° C. and to cyclically increase the pressure prevailing therein to values above the ambient pressure, the reactor 3 being relieved of pressure at the end of each cycle and the temperature being lowered to just below 100° C. For this purpose, it is possible in particular for cooling of the withdrawal stream of the aqueous liquid by means of the heat exchanger 16 to be provided. Because the reactor 3 has to be heated up again for the subsequent cycle, it could be expedient in this case to design the heat exchanger 16 as recuperative, it being possible for the material stored in a pressure lock 31 or some other intermediate silo, for example, to serve as storage mass for the intermediate storage of thermal energy. In this respect, it can also be provided to subdivide such an intermediate silo into individual sections and to design the walls and intermediate walls of such an intermediate silo in such a way that the temperature regulating medium of the temperature regulating device 17 can flow through said walls in order to be able to realize the best possible transfer of thermal energy. As an additional control element for rapid temperature regulation interventions, it is also possible to provide a hollow-walled design of a lower tower of the screening device 21, if it were possible for the temperature regulating medium to flow through it.

LIST OF REFERENCE SIGNS

1 Storage area
2 First comminuting device

3 Reactor
4 Material inlet
5 Liquid outlet
6 Gas outlet
7 Liquid inlet
8 CO2 gas storage means
9 Gas inlet
10 Material outlet
11 Mixing device
12 Introducing device
13 Pump
14 Separating device
15 Product storage area
16 Heat exchanger
17 Temperature regulating device
18 Heat source/heat sink
19 Conveying device
20 Classifying device
21 Screening device
22 Separating device
23 Material return line
24 Second comminuting device
25 Product storage area
26 Pump
27 Product storage area
28 Analyzing device
29 Material return line
30 Shut-off valve
31 Pressure lock

What is claimed is:

1. A method for processing material that contains cement rock, the method comprising:
comminuting the material in a first comminuting device;
feeding the material to a reactor in which the material is mixed with an aqueous liquid and $CO_2$, wherein a mixing movement of the material is generated in the reactor;
maintaining a temperature in the reactor at greater than 100° C. and maintaining a pressure in the reactor to be greater than an atmospheric pressure; and
removing the material from the reactor and subdividing the material into at least two fractions via a classifying device, wherein the at least two fractions include at least a coarse fraction and middle fraction and wherein the coarse fraction is larger than 16 mm and the middle fraction is smaller than 16 mm, further comprising returning the coarse fraction of the at least two fractions to the reactor and comminuting the coarse fraction in a second comminuting device before returning the coarse fraction to the reactor.

2. The method of claim 1 comprising:
removing a withdrawal stream of the aqueous liquid from the reactor; and
separating and discharging suspended particles of the material from the withdrawal stream.

3. The method of claim 2 comprising returning the withdrawal stream to the reactor as a recirculation stream after the separation of the suspended particles.

4. The method of claim 1 comprising:
subdividing the material removed from the reactor into at least three fractions via the classifying device, including a fine fraction, a middle fraction, and a coarse fraction; and
discharging the fine fraction and the middle fraction.

5. The method of claim 4 wherein the middle fraction has a grain size of between 2 mm and 16 mm.

6. The method of claim 1 comprising analyzing a smaller fraction of the at least two fractions in terms of cement rock content.

7. The method of claim 6 comprising returning the smaller fraction to the reactor where the cement rock content is determined to be greater than a limit value.

8. The method of claim 1 comprising introducing a basic additive into the reactor.

9. The method of claim 1 wherein the aqueous liquid and the $CO_2$ flow through the material in the reactor in a counterflow arrangement.

10. The method of claim 1 comprising separating the at least two fractions from a discharge stream of the aqueous liquid that was removed from the reactor together with the material.

11. The method of claim 10 comprising at least partially returning the discharge stream of the aqueous liquid freed from the at least two fractions to at least one of the classifying device or the reactor.

12. The method of claim 1 comprising removing a gas stream of $CO_2$ from the reactor and recirculating the removed gas stream of $CO_2$ to the reactor.

13. The method of claim 1 comprising removing non-mineral constituents from the material before the material is introduced into the reactor.

14. A plant for processing material that contains cement rock, the plant comprising:
a first comminuting device for comminuting the material;
a reactor that is connected to the first comminuting device in a material-carrying manner, the reactor comprising a mixing device;
a fluid supply for an aqueous liquid that is connected to the reactor in a fluid-conducting manner;
a gas supply for $CO_2$ that is connected to the reactor in a fluid-conducting manner;
a classifying device connected to the reactor in a material-carrying manner, the classifying device configured to subdivide the material into at least two fractions;
a temperature regulating device for influencing a temperature in the reactor;
a pressure regulating device for influencing a pressure in the reactor; and
a material return line for returning at least one of the at least two fractions from the classifying device to the reactor; and
a second comminuting device integrated into the material return line.

15. The plant of claim 14 comprising:
a material inlet, a liquid outlet, and a gas outlet disposed at a first end of the reactor; and
a material outlet, a liquid inlet, and a gas inlet disposed at a second end of the reactor.

16. The plant of claim 14 comprising a separating device for separating suspended particles from a withdrawal stream of the aqueous liquid that has been discharged from the reactor.

17. The plant of claim 14 comprising at least one of:
an analyzing device for analyzing a cement rock content in at least one of the at least two fractions;
an introducing device for introducing a basic additive into the reactor;
the reactor configured as a vertical reactor;
a gas return line for returning $CO_2$ from a gas outlet to a gas inlet of the reactor; or a removing device for removing non-mineral constituents of the material before the material is introduced into the reactor.

* * * * *